(12) United States Patent
Christian et al.

(10) Patent No.: US 7,220,082 B1
(45) Date of Patent: *May 22, 2007

(54) PNEUMATIC TUBE SYSTEM TERMINAL AND METHOD

(75) Inventors: Todd Christian, Dalton, OH (US); Neil Gromley, Kensington, OH (US); Gary Baker, Bolivar, OH (US); Daniel S. McIntyre, Uniontown, OH (US); Donald S. Nelson, Jr., Akron, OH (US); Edward J. Ujhazy, Jr., Uniontown, OH (US)

(73) Assignee: Diebold, Incorporated, North Canton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/245,640

(22) Filed: Oct. 7, 2005

Related U.S. Application Data

(60) Provisional application No. 60/619,480, filed on Oct. 15, 2004.

(51) Int. Cl.
*B65G 51/26* (2006.01)
(52) U.S. Cl. ............... 406/112; 406/176; 406/149
(58) Field of Classification Search ............... 406/1, 406/2, 3, 110, 111, 112, 176, 179, 180, 177, 406/178, 148, 149, 150
See application file for complete search history.

(56) References Cited

U.S. PATENT DOCUMENTS

| 675,050 A | * | 5/1901 | Sheppard | 191/17 |
|---|---|---|---|---|
| 676,050 A | * | 6/1901 | Sheppard | 406/176 |
| 1,517,671 A | * | 12/1924 | Dinspel | 406/176 |
| 1,519,994 A | * | 12/1924 | Koenig | 406/176 |
| 3,294,342 A | * | 12/1966 | McClure et al. | 406/19 |
| 3,298,632 A | * | 1/1967 | Carson | 406/112 |
| 3,985,316 A | * | 10/1976 | Weissmuller | 406/110 |
| 4,084,770 A | * | 4/1978 | Warmann | 406/149 |
| 4,135,684 A | * | 1/1979 | Willey | 406/13 |
| 4,436,456 A | * | 3/1984 | Thomas | 406/19 |
| 4,459,069 A | * | 7/1984 | Ahr et al. | 406/74 |
| 4,715,750 A | * | 12/1987 | Podoll et al. | 406/111 |
| 4,792,263 A | * | 12/1988 | Podoll | 406/189 |
| 4,913,598 A | * | 4/1990 | Dozier | 406/112 |
| 5,131,792 A | * | 7/1992 | Grosswiller et al. | 406/112 |
| 5,299,891 A | * | 4/1994 | Grosswiller et al. | 406/112 |
| 5,304,017 A | * | 4/1994 | Vogel et al. | 406/111 |
| 5,368,417 A | * | 11/1994 | Benjamin et al. | 406/111 |
| 5,725,124 A | * | 3/1998 | Bustos et al. | 221/211 |
| 5,846,030 A | * | 12/1998 | Beard et al. | 406/1 |
| 6,146,057 A | * | 11/2000 | Gromley et al. | 406/10 |
| 6,672,807 B1 | * | 1/2004 | McIntyre et al. | 406/180 |
| 6,672,808 B1 | * | 1/2004 | McIntyre et al. | 406/197 |

* cited by examiner

*Primary Examiner*—Joe Dillon, Jr.
(74) *Attorney, Agent, or Firm*—Ralph E. Jocke; Daniel D. Wasil; Walker & Jocke

(57) ABSTRACT

A pneumatic transport system including a user terminal at a service provider station having a movable member operably connected with a flexible drive member. The drive member moves within at least one side rail to vertically displace the movable member to permit access to a carrier at the user terminal. The user terminal includes control mechanisms on opposite sides of a base to enable two users to operate and access the carrier at the user terminal.

25 Claims, 13 Drawing Sheets

PNEUMATIC TUBE SYSTEM TERMINAL AND METHOD

CROSS REFERENCE TO RELATED APPLICATION

This application claims benefit to 35 U.S.C. § 119(e) of Provisional Application 60/619,480 filed Oct. 15, 2004.

TECHNICAL FIELD

This invention generally relates to pneumatic tube transaction systems and more specifically to the construction and operation of a user terminal operated in conjunction with a transaction system.

BACKGROUND ART

Pneumatic tube transfer systems may be used to carry out transactions. Such systems may be used to conduct transactions between a service provider and customers at remote locations. Such systems may be used in drive-through banking applications as well as in other transaction environments.

Pneumatic tube systems provide a fast and convenient way of handling customer transactions. In a typical pneumatic tube system, a customer station is positioned at a distant location from the service provider station in a bank or other institution. A teller or other service provider is positioned at a service provider station located within the bank. A pneumatic carrier is employed and moved through a tube by differential air pressure to send cash, checks, or other items that may be housed in the carrier between the service provider and the customer. The carrier is accessed by the customer at a remote terminal. The carrier is accessed by the service provider at a service provider terminal.

Service provider terminals are often arranged so that only a single teller or other service provider at a time may readily access a carrier at a service provider terminal. This can present drawbacks in use of the same terminal by multiple service providers. This can also limit options for configurations of service provider areas and limit efficiency. Service provider terminals may also benefit from improvements in construction and methods of operation.

DISCLOSURE OF INVENTION

It is an object of an exemplary embodiment of the present invention to provide an apparatus through which a customer may conduct a transaction with a remote service provider.

It is a further object of an exemplary embodiment of the present invention to provide a user terminal adapted for use by a service provider to send and receive a carrier that is movable responsive to air pressure.

It is a further object of an exemplary embodiment of the present invention to provide a user terminal that is by two users.

It is a further object of an exemplary embodiment of the present invention to provide a user terminal having ergonomic features that facilitate ease of use.

It is a further object of an exemplary embodiment of the present invention to provide a user terminal having a movable tubular member adapted for vertical displacement to provide access to an opening in the user terminal.

It is a further object of an exemplary embodiment of the present invention to provide a user terminal having a movable member that allows a user to view a carrier in the user terminal through the member.

It is a further object of an exemplary embodiment of the present invention to provide a user terminal having a flexible drive tape member for achieving coordinated movement of the movable member.

It is a further object of an exemplary embodiment of the present invention to provide a user terminal having a guide block in a base member in which a flexible drive tape member is slidably engaged.

It is a further object of an exemplary embodiment of the present invention to provide a user terminal having a pair of side rails to guide and support the movement of the movable member.

It is a further object of an exemplary embodiment of the present invention to provide a user terminal having a rodless cylinder or other moving drive member to guide and support the movement of a movable member.

It is a further object of an exemplary embodiment of the present invention to provide a user terminal having telescoping members to allow access to a carrier through an opening in the user terminal.

It is a further object of an exemplary embodiment of the present invention to provide a pneumatic transfer apparatus including a user terminal, a transport tube, a blower, a remote terminal, and a carrier.

It is a further object of an exemplary embodiment of the present invention to provide a user terminal having members with sealing surfaces to control air passage from the tube ahead of a moving carrier in a pneumatic transport system.

It is a further object of an exemplary embodiment of the present invention to provide a method for operation of a user terminal of a pneumatic tube system.

Further objects of exemplary embodiments of the present invention will be made apparent in the following Best Modes For Carrying Out Invention and the appended claims.

The foregoing objects are accomplished in an exemplary embodiment by a system in which a pneumatic transfer apparatus operates to transfer a carrier through a transfer tube responsive to differential air pressure between a remote terminal located at a customer station and a user terminal located at a service provider station.

The exemplary user terminal includes a body having an opening in fluid communication with the transfer tube. In the exemplary embodiment, the user terminal includes a tubular member that is selectively movable between a closed position in which a lower end of the tubular member is adjacent a base, and an open position in which the lower end is vertically displaced from the base. A drive extending within the base operates to cause the selective movement of the movable member.

In the exemplary embodiment, the movable member is operatively connected to a flexible drive tape that is slidably engaged with a first side rail. The flexible drive tape includes apertures or slots therein for engagement with a toothed sprocket that operates responsive to the drive. In one exemplary embodiment, the first side rail has an elongated passageway therein. The flexible drive tape is adapted for slidable supported movement within the elongated passageway of the first side rail.

In the exemplary embodiment, the flexible drive tape has a length sufficient to extend alongside the movable member in a first side rail, through an arcuate channel extending in the base member, and into a second side rail disposed from the first side rail. A first portion of the flexible drive tape is operatively connected to the movable member. A second portion of the flexible drive tape moves in the base, and an extension portion includes a free distal end of the flexible drive tape which moves in the second side rail.

In the exemplary embodiment, the base of the user terminal includes two manually actuatable control mechanisms situated on opposite sides of the base. The control mechanisms enable two users situated on opposite sides of the terminal to independently operate the user terminal and control the system. The disposed side rails of the exemplary embodiment allow for access to the opening in the user terminal by users positioned on opposite sides. For example, the exemplary user terminal may be easily operated and accessed by two users arranged in side-by-side relationship at a service provider station with the user terminal situated between them.

In the exemplary embodiment, the base includes inclined faces with the control mechanisms accessible thereon to facilitate user operation. The exemplary embodiment of the user terminal also includes a resilient arrival pad and has ergonomic properties that facilitate pneumatic carrier placement and removal.

In an exemplary embodiment, a carrier is moved from a tube into an opening in the body of the user terminal via pneumatic pressure forces acting on the carrier. A user operates a control mechanism to cause the drive sprocket located in the base to rotate about its axis. Successive radially-extending teeth of the drive sprocket engage successive apertures in a flexible drive tape and move the tape member. The flexible drive tape is operatively connected to the movable member and is guided and supported in a side rail. The drive sprocket rotates in a first direction to vertically dispose the lower end of the movable member away from the base. As the movable member is vertically displaced, at least a portion of a stationary upper member telescopes into the interior of the movable member. When the movable member is disposed away from the base and moves to an open position, the carrier is accessible to the user through the opening created by the upward movement of the moveable member. The carrier can then be removed from its position in supporting connection with the base. The service provider may then remove items from and/or add items to the carrier for purposes of carrying out a transaction.

In order to send the carrier from the user terminal to a remote terminal, a user positions the carrier within the opening in the user terminal. The carrier engages the stationary upper member such that a fluid seal is formed between the carrier and an annular seal thereon and an inner wall of the upper member. The carrier is then pneumatically transported to the remote terminal through a tube by differential air pressure produced via operation of at least one blower.

Before the carrier is again moved from the customer terminal to the user terminal the system operates responsive to user input to at least one control mechanism to cause the drive to rotate the drive sprocket in the opposite direction to that when the movable member is being opened. The drive tape member moves in response to the drive sprocket and thereby causes the lower end of the movable member to be vertically moved toward the base. A resilient arrival pad on the base and a sealing surface on the movable member cooperate to form a generally airtight seal between the stationary member, movable member and the base. The carrier is then moved to adjacent the user terminal through operation of at least one blower. The carrier falls into the interior of the user terminal with its descent being slowed by the generally airtight seal creating a generally cushioning column of air below the carrier.

BEST MODES FOR CARRYING OUT INVENTION

Figure 1:
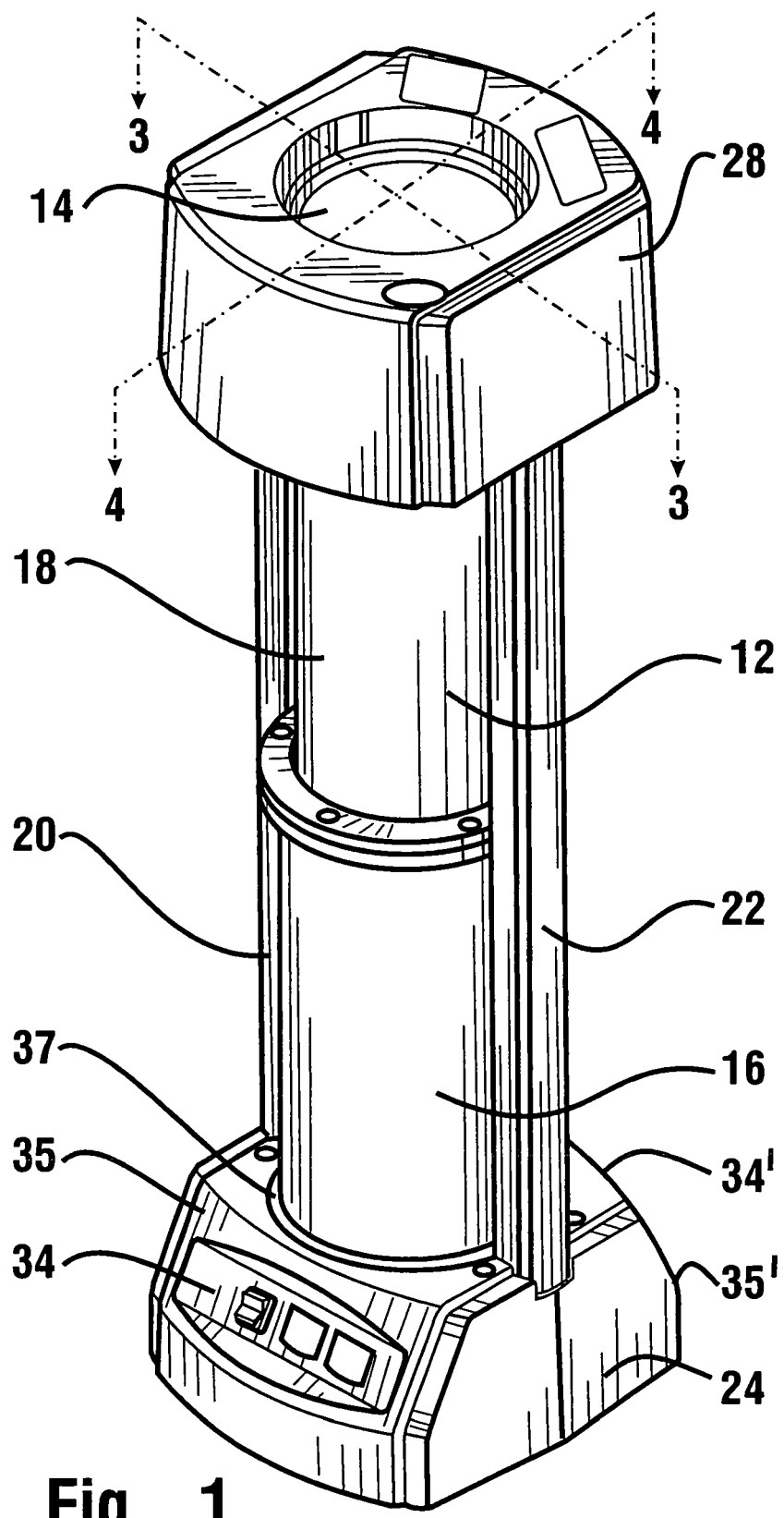
FIG. 1 is a perspective view of an exemplary embodiment of a user terminal with a movable member, in a closed position.

With reference to FIG. 1, there is shown an exemplary service provider user terminal 10 that is adapted to send and receive a carrier that is movable in response to air pressure through a transport tube as will be discussed in further detail below.

User terminal 10 includes a body 12 having an opening 14 therein through which a carrier may be sent and received. User terminal 10 includes a movable member 16 and a stationary upper member 18. In an exemplary embodiment both the movable member and stationary member are generally cylindrical. In other embodiments other configurations may be used.

In one exemplary embodiment, body 12 has in fixed supporting connection therewith first and second side rails 20, 22 extending vertically in disposed relation from a base 24. A cap member 28 is positioned adjacent first and second side rails 20, 22 at a position vertically disposed from base member 24.

Figure 2:
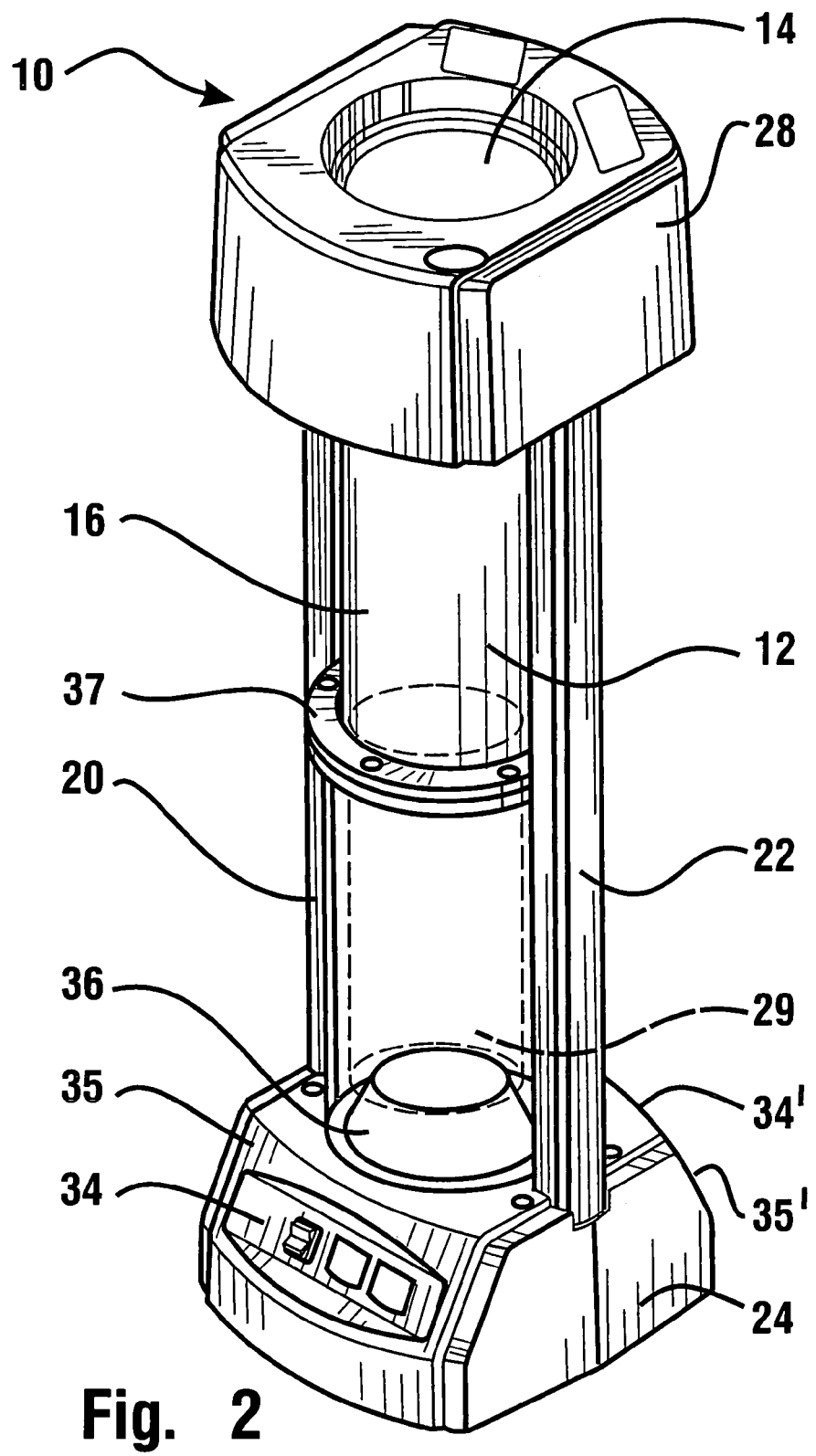
FIG. 2 is a perspective view of the exemplary embodiment of the user terminal shown in FIG. 1, with the movable member in the open position.

Movable member 16 is operative to selectively move in a vertical direction toward and away from base member 24. The closed position of movable member 16 is defined as when movable member 16 is in its lowermost position, as illustrated in FIG. 1. The open position of movable member 16 is defined as when movable member 16 is in its uppermost position, as illustrated in FIG. 2. In the exemplary embodiment, the opening 14 in body 12, and any carrier 29 (shown in phantom) held therein, is not accessible by a user when the movable member 16 is in the closed position.

In an exemplary embodiment, base 24 includes a manually actuatable control mechanism 34 operable to control movement of movable member 16 between the closed and open positions. Control mechanism 34 is further operable to cause a carrier 29 to be sent from or received at user terminal 10. In an exemplary embodiment, user terminal 10 includes two control mechanisms 34, 34' situated in recessed areas on opposing sides of base 24.

Base 24 of the exemplary embodiment is dimensioned for ergonomic ease of use by one or two adjacent users. For example, a face 35 of the base member 24 is inclined and angled upward so that the control mechanism 34 may be easily manually accessed. An opposite face 35' is similarly inclined so that an additional control mechanism 34' may be easily accessed and operated.

With particular reference to FIG. 2, exemplary base 24 further includes a resilient member or arrival pad 36 operable to partially cushion the landing of a carrier as it traverses through the opening 14 of body 12. In an exemplary embodiment, the arrival pad includes a raised area to provide a resilient force absorbing portion that protects the carrier and its contents from excessive impact force upon arrival at the user terminal. Arrival pad 36 is further operable to cooperate with a sealing surface 37 on a lower end of movable member 16 to create a generally airtight seal when the movable member 16 is in the closed position. The seal helps to provide a generally controlled release of air from the terminal ahead of a carrier at the user terminal. This controlled air release cushions and limits the speed of a carrier as it arrives in the user terminal.

As illustrated in FIG. 2, in this exemplary embodiment, movable member 16 is movable relative to side rails 20, 22. Upper member 18 (not shown in this view) and movable member 16 are dimensioned so that in the exemplary embodiment at least a portion of upper member 18 telescopes with and moves in overlapping relation with the movable member 16 as movable member 16 moves from the closed position to the open position. In the exemplary embodiment, movable member 16 and at least the telescoping portion of upper member 18 are circular in cross-section, although other configurations may be used in other embodiments. In the exemplary embodiment, at least one movable member 16 is formed of transparent or translucent material in order to allow a user to view a carrier that is positioned within the user terminal 10 when movable member 16 is in the closed position.

Figure 3:
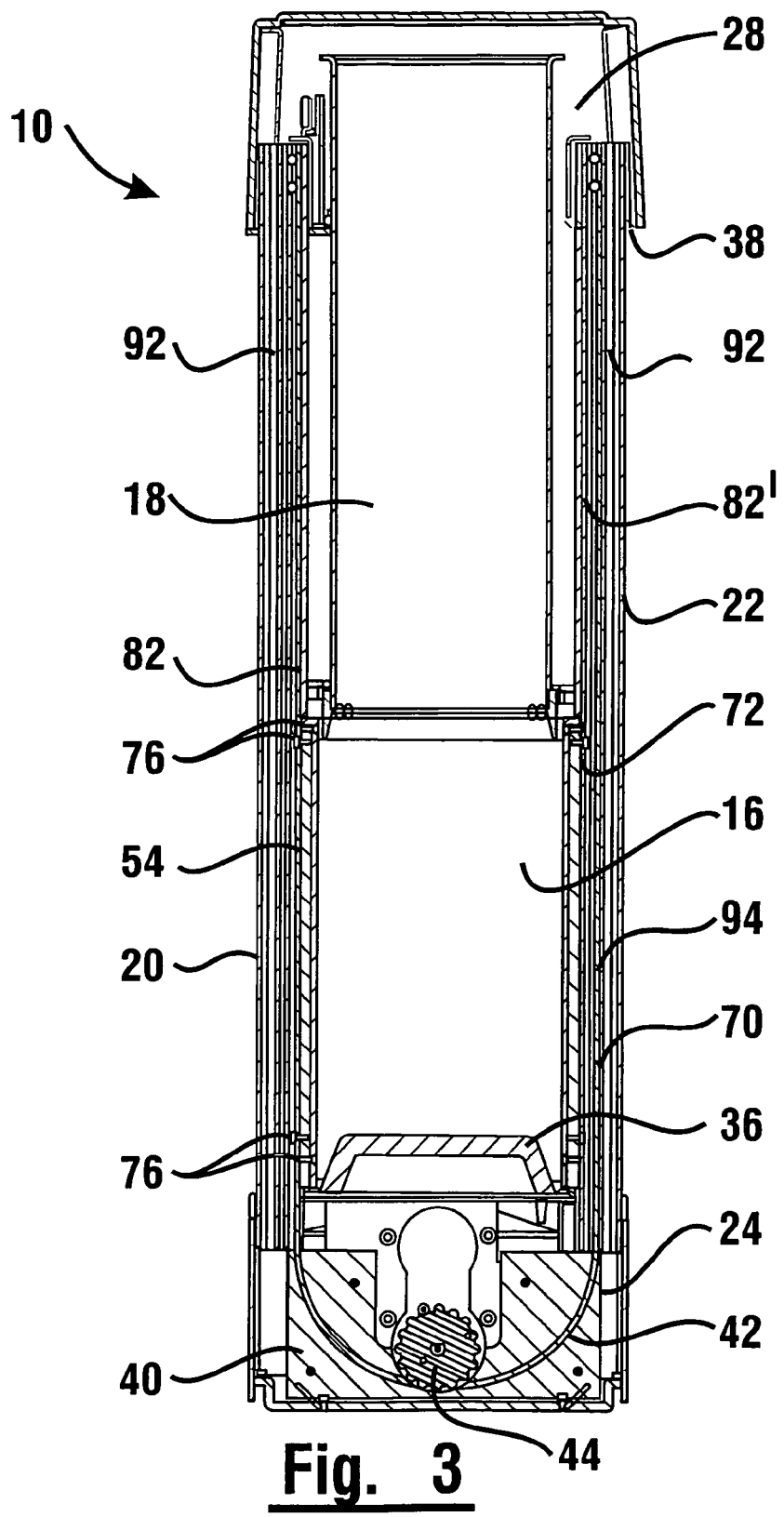
FIG. 3 is a cross-sectional view of the exemplary embodiment of the user terminal shown in FIG. 1 taken along line 3-3.
Figure 4:
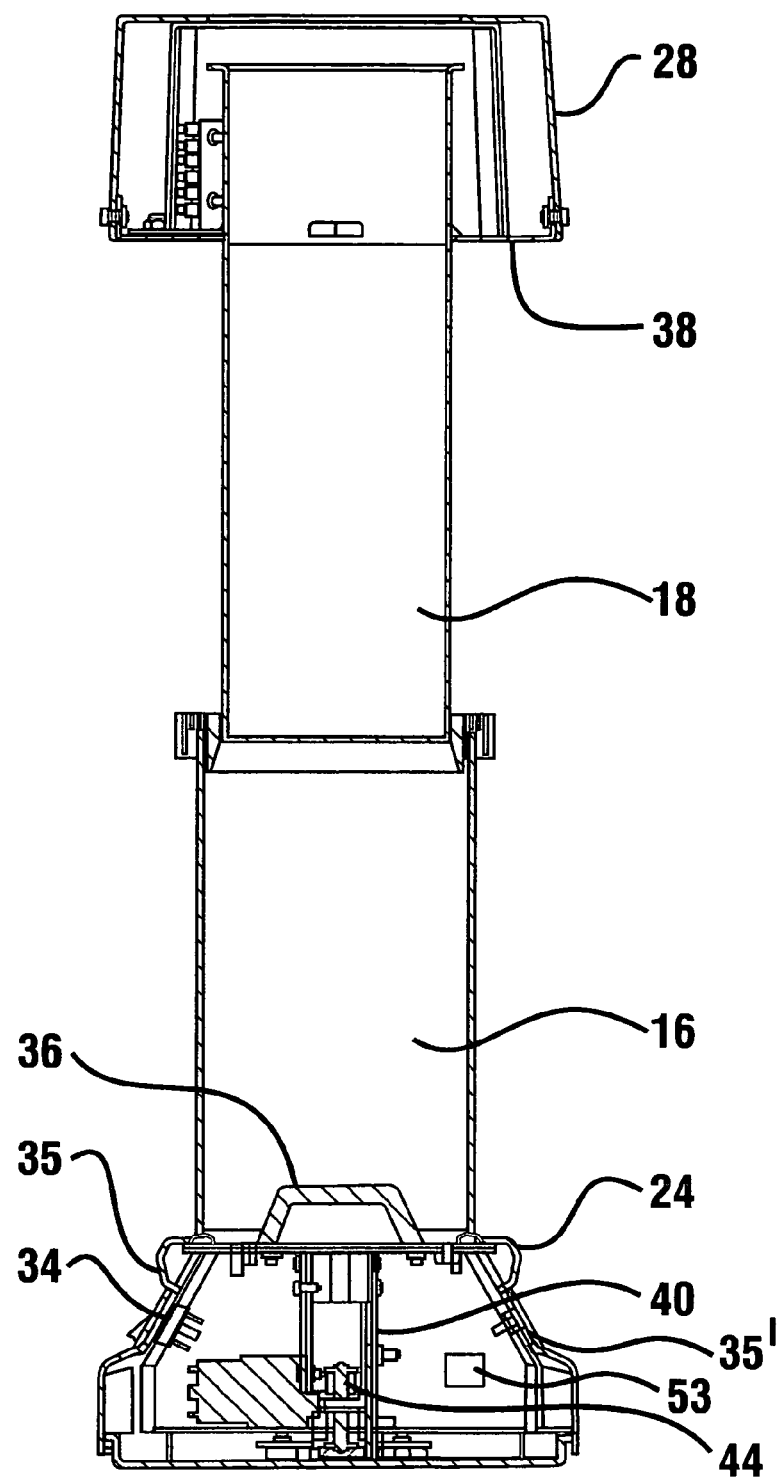
FIG. 4 is a cross-sectional view of the exemplary embodiment of the user terminal shown in FIG. 1 taken along line 4-4.
Figure 5:
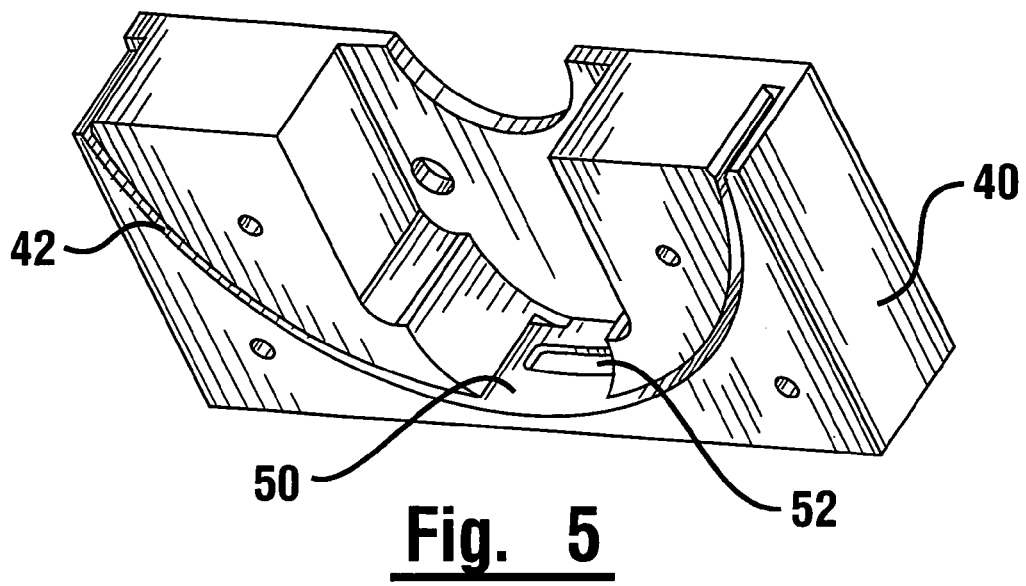
FIG. 5 is a perspective view of an exemplary embodiment of a guide block for use in an exemplary user terminal.

As shown in FIGS. 3 and 4, in an exemplary embodiment, cap member 28 includes bracket 38 for holding upper member 18 and first and second side rails 20, 22 in operative alignment.

As best shown in FIGS. 3-6, base 24 includes a guide block 40 having an arcuate or U-shaped channel 42 therein. Channel 42 includes an open expanded region 50 including a drive slot 52.

Figure 6:
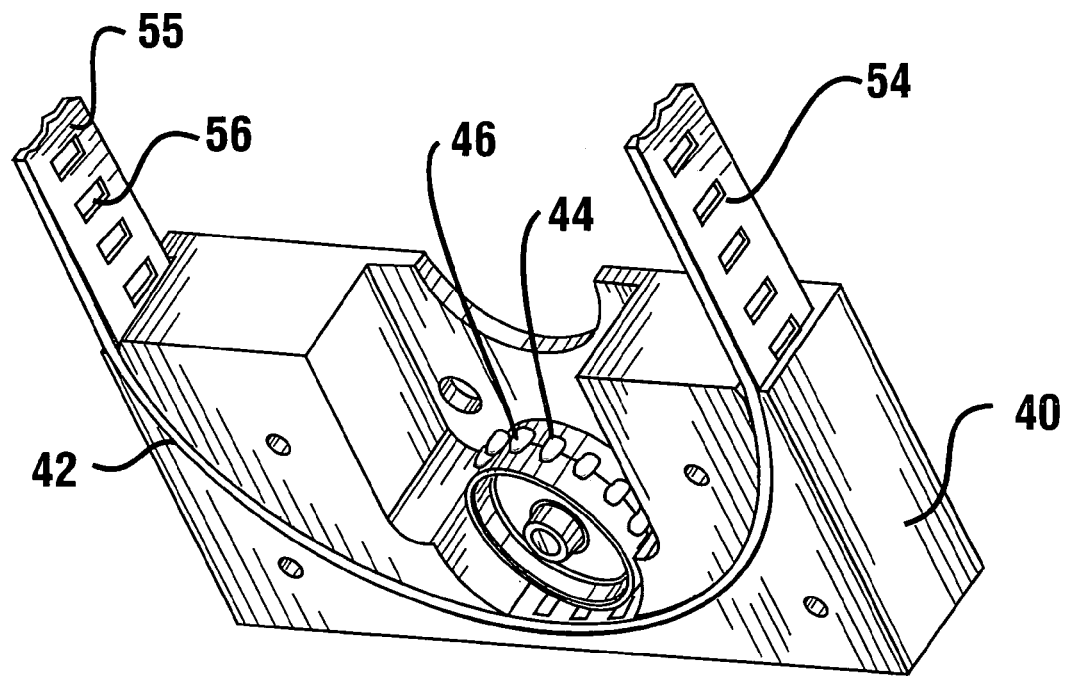
FIG. 6 is a perspective view of the guide block shown in FIG. 5 additionally showing an operative arrangement of a drive tape member and a drive sprocket.

In this exemplary embodiment, base 24 has extending therein a rotatable drive sprocket 44, in operative connection with a drive. The exemplary drive comprises a reversible electric motor or other suitable device for selectively rotating the drive sprocket. As best seen in FIG. 6, drive sprocket 44 includes a plurality of radially-extending projections or teeth 46. Drive sprocket 44 is situated in base 24 so that as it rotates about its axis successive teeth 46 enter expanded region 50 of channel 42. Drive slot 52 provides sufficient clearance for teeth 46 as drive sprocket 44 rotates. In the exemplary embodiment, drive sprocket 44 is operative to rotate responsive to one or more manual user inputs to control mechanisms 34, 34'. Control mechanisms 34 and 34' may include switches or other controls which are in operative connection with suitable control circuitry 53 to cause selective rotation of the sprocket. The control circuitry may include in some embodiments suitable processor based circuitry and in other embodiments may include relay logic. Various approaches may be used.

The exemplary flexible drive tape member 54 comprises an elongated body 55 having a plurality of engageable apertures which are alternatively referred to herein as slots 56 therein. Slots 56 are dimensioned to receive teeth 46 of drive sprocket 44. Drive tape member 54 is operably associated with drive sprocket 44 so that as drive sprocket 44 is rotated, successive teeth 46 are engaged in successive slots 56 to cause movement of drive tape member 54 and controlled movement of moveable member 16, as will be explained in further detail below.

Figure 7:
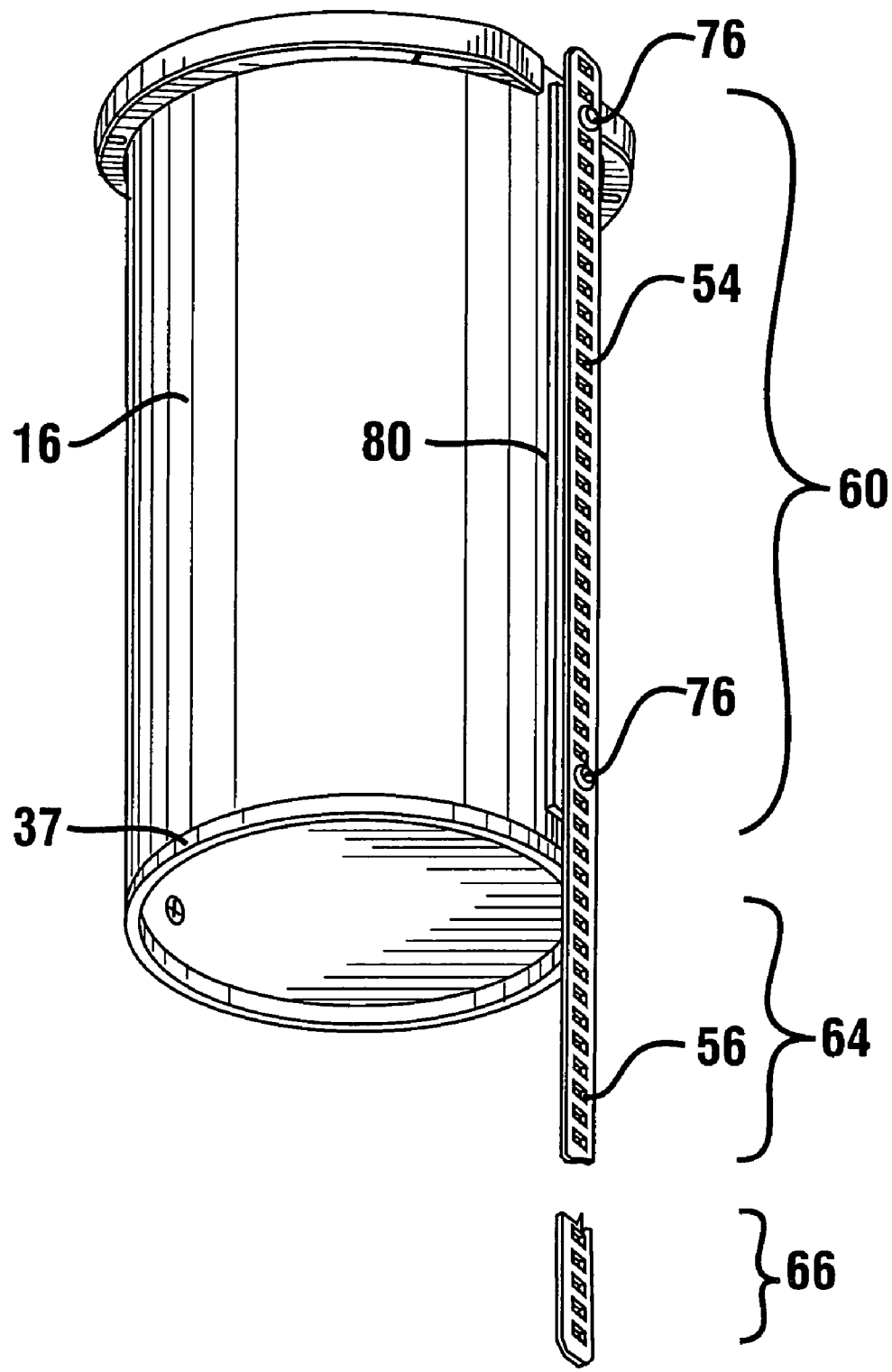
FIG. 7 is a perspective view of an exemplary embodiment of a movable member in operative engagement with the drive tape member shown in FIG. 6.

With reference to FIG. 7, in the exemplary embodiment drive tape member 54 is in operative connection with movable member 16. Drive tape member 54 includes a first portion 60, a second portion 64, and an extension portion 66. First portion 60 includes that portion of drive tape member 54 extending along the length of moveable member 16. Second portion 64 includes that portion of drive tape member 54 that moves into and out of guide block 40 responsive to movement of the drive mechanism and drive sprocket 44. Extension portion 66 includes a free distal end 70 of drive tape member 54.

Figure 8:
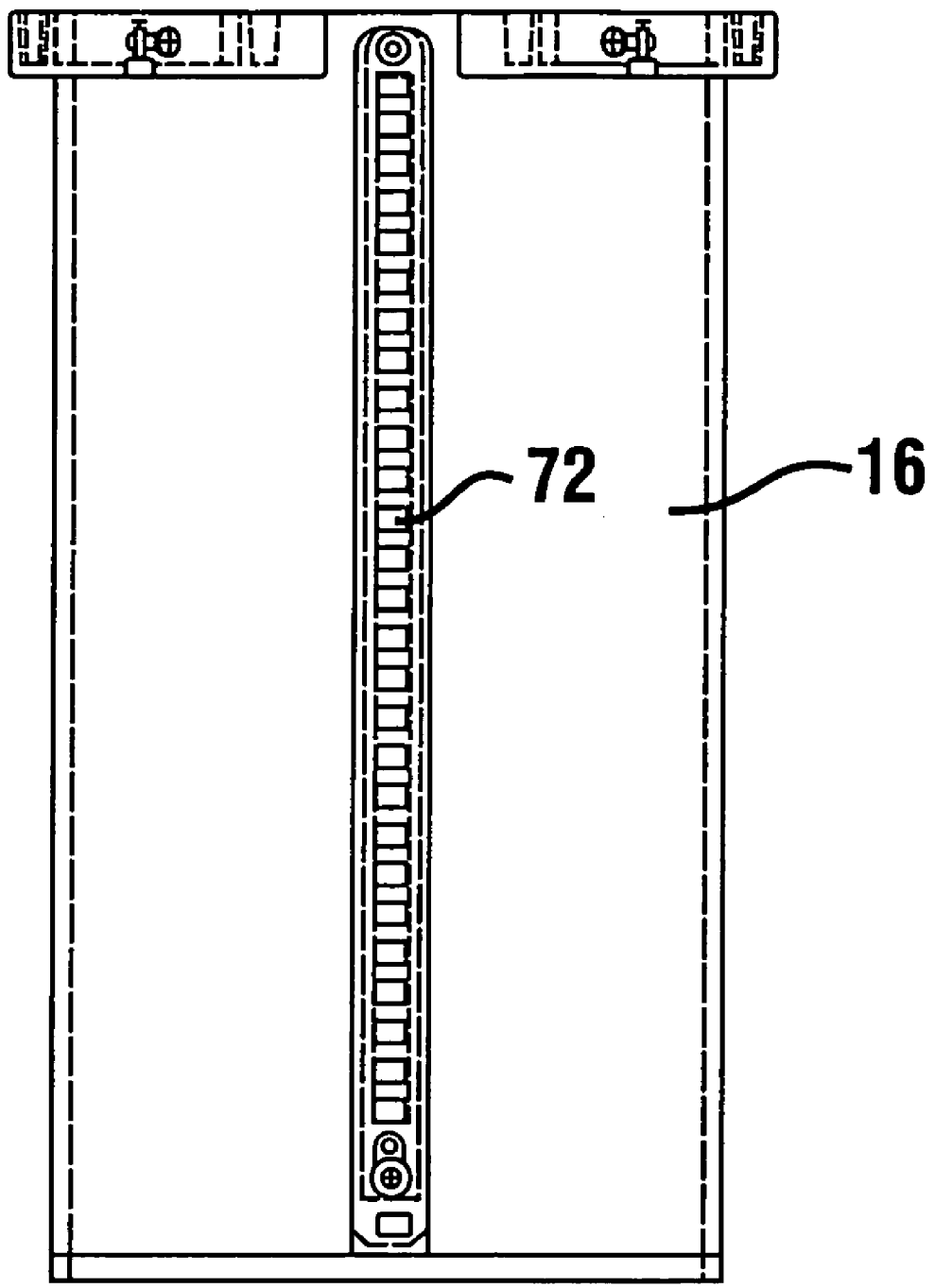
FIG. 8 is a side view of the movable member showing a guide tape.

With reference to FIG. 8, in the exemplary embodiment, a guide tape member portion 72 is operably connected to movable member 16 at a position opposed to the position of drive tape member 54. Guide tape member portion 72 may be similar in construction to drive tape member 54. However, the guide tape member portion operates to guide movement of movable member 16, not drive its movement. In an exemplary embodiment, guide tape member portion 72 is slidably operatively connected in supporting connection with second side rail 22.

With particular reference to FIGS. 3 and 7, in the exemplary embodiment, drive tape member 54 is operatively attached to movable member 16 via one or more fasteners 76. In an exemplary embodiment, two sets of oppositely situated fasteners 76 are utilized. In the exemplary embodiment, a mounting member 80 is mounted adjacent the movable member 16 and is generally situated between movable member 16 and a first portion 60 of flexible drive tape member 54.

Figure 9:
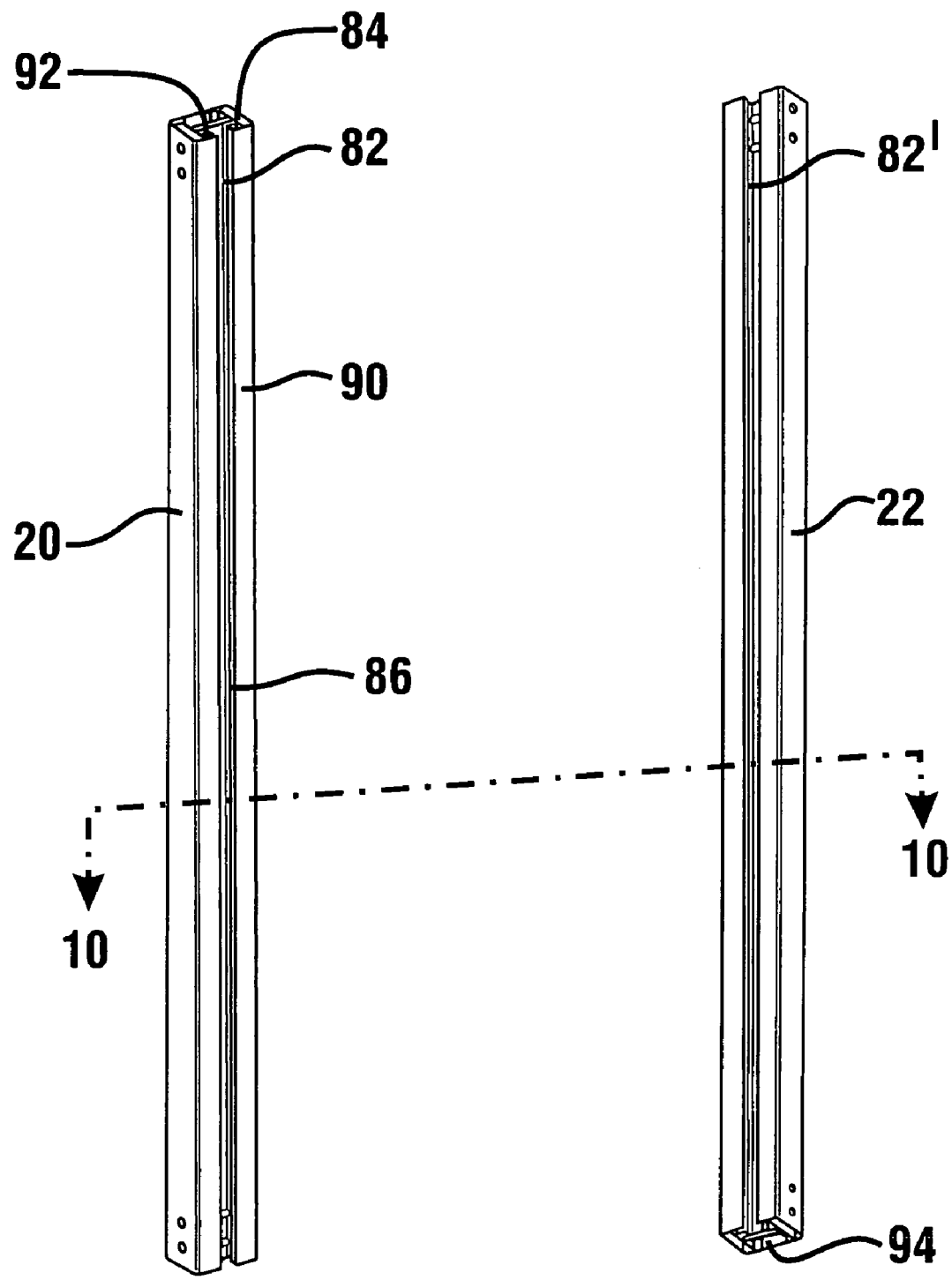
FIG. 9 is a perspective view showing first and second side rails.
Figure 10:
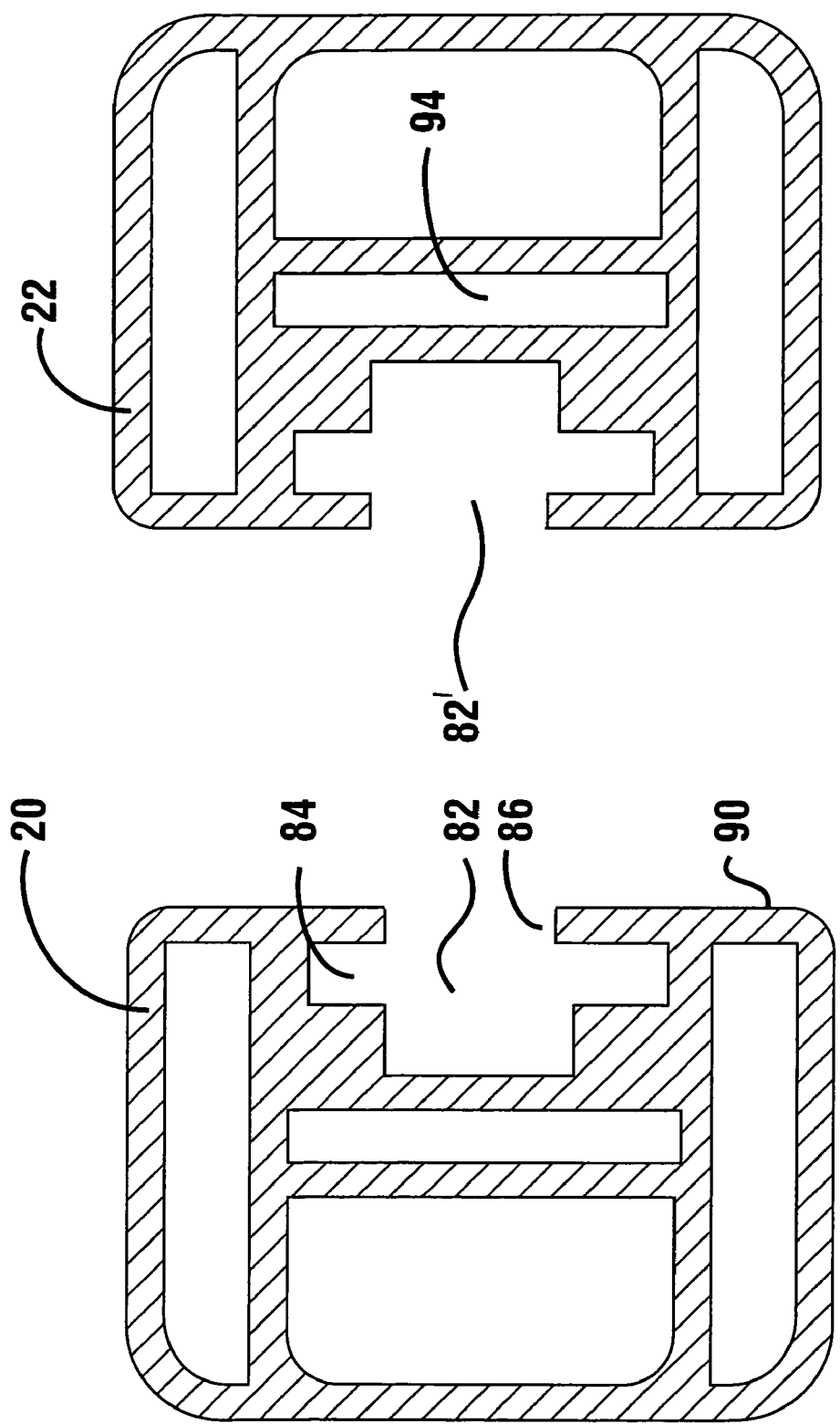
FIG. 10 is a cross-sectional view of the first and second side rails taken along line 10-10 of FIG. 9.

With reference to FIG. 9, in the exemplary embodiment, first and second side rails 20, 22 are substantially identical in construction, although other configurations may be used. In the exemplary embodiment, the side rails have the cross-sectional configurations as illustrated in FIG. 10. The first side rail includes an elongated passageway 82 having a widened portion 84 dimensioned to receive drive tape member 54 in slidable supporting engagement therein. In the exemplary embodiment, the passageway 82 includes a narrowed slot portion 86 opening though an inward-facing wall 90 of first side rail 20. First side rail 20 further includes an elongated passage 92 therein which may be adapted to house wiring and/or other components (not shown). Second side rail 20 may include a similar elongated passage 92'. Narrowed slot portion 86 of side rail 20 is adapted to accommodate movement of fasteners 76 therein as drive tape member 54 slides relative to side rail 20. In the exemplary embodiment the side rails are each of unitary construction, and are formed through an extrusion process.

In the exemplary embodiment, second side rail 22 includes an elongated passageway 82' dimensioned to receive guide tape member 72 in slidable engagement therein. Second side rail 22 further includes an elongated channel 94 therein which is dimensioned to receive extension portion 66 including distal end 70 of drive tape member 54 in slidable supporting engagement therein.

With reference to FIGS. 3, 9, and 10, when first side rail 20 is situated in operative engagement with base 24, passageway 82 is in operative aligned communication with channel 42. Drive tape member 54 is thus movable within first side rail 20 and within channel 42. When second side rail 22 is situated in engagement with base member 24, elongated channel 94 is in operative aligned relation with channel 42. Thus, drive tape member 54 is further movable within elongated channel 94. Drive tape member 54 extends in length beyond the lower end of movable member 16 and into channel 42 for operative engagement with drive sprocket 44. The distal end 70 of the drive tape member 54 is free to move within elongated channel 94. Guide tape member 54 is operably slidably engaged in passageway 82'.

Figure 11:
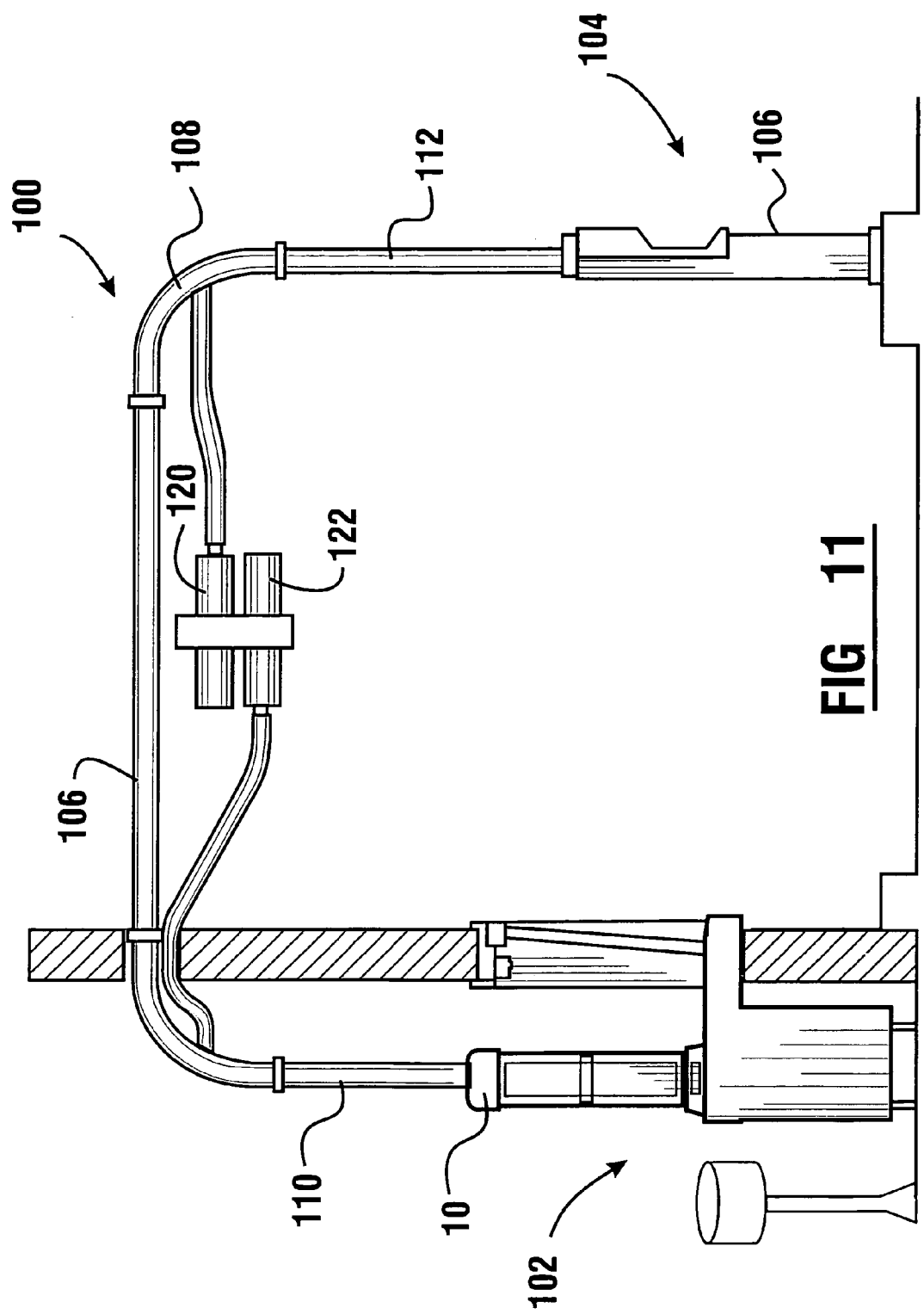
FIG. 11 is a front view of a pneumatic transport system illustrating the exemplary user terminal.

With reference to FIG. 11, in an exemplary embodiment, user terminal 10 is operable as part of a transaction system, shown generally at 100. The transaction system 100 includes a service provider station, shown generally at 102, and a customer station, shown generally at 104. In an exemplary embodiment, the service provider station is positioned within a transaction facility such as a bank, casino, pharmacy or store. Transaction system 100 is of an exemplary configuration. Other configurations of transaction systems and components thereof are shown in U.S. Pat. Nos. 6,672, 808; 6,146,057; 5,735,644; and 5,299,891 and application Ser. No. 08/889,033 filed Jul. 7, 1997 the disclosures of each of which are incorporated herein by reference.

Exemplary user terminal 10 is operatively connected to remote terminal 106 by a pneumatic tube transfer conduit 108. The pneumatic tube transfer conduit 108 includes a first generally vertically extending leg portion 110 which is adjacent to and in communication with the user terminal 10. The second generally vertically extending leg portion 112 is adjacent to and in communication with the remote terminal 104. A transversely extending portion 116 extends generally horizontally between the first and second leg portions 110, 112. The transverse portion 116 is connected to the vertically extending leg portions through radiused bends in the conduit which are radiused to enable the passage of a pneumatic carrier therethrough between user terminal 10 and remote terminal 106. Remote terminal 106 may be similar in construction to those customer terminals of the incorporated disclosures. In some embodiments the customer terminal may be similar to the user terminal disclosed herein. Remote terminal 106 is operable to allow a customer to access a carrier and exchange items with a service provided at the user terminal.

In an exemplary embodiment a first blower 120 is fluidly connected to transfer conduit 108 (which is alternatively referred to herein as a transport tube) generally in the area above the remote terminal 106. Blower 120 may be selectively operated responsive to suitable electrical control circuitry in operative connection with the control mechanisms on one or both terminals to draw negative pressure in the transfer conduit in the area generally above the remote terminal. Blower 120 further includes suitable valving so that when the blower 120 is not operated, air is generally prevented from entering the transfer conduit 108 through the blower 120. A blower 122 similar to blower 120 is connected to the transfer conduit in the area generally above user terminal 10. Blower 122 may be selectively operated responsive to suitable control circuitry in operative connection with the control mechanisms on one or both terminals to selectively produce negative pressure in the transfer conduit above the user terminal 10. Like blower 120, when blower 122 is not operating, air is generally prevented from entering the transfer conduit through the blower.

Figure 12:
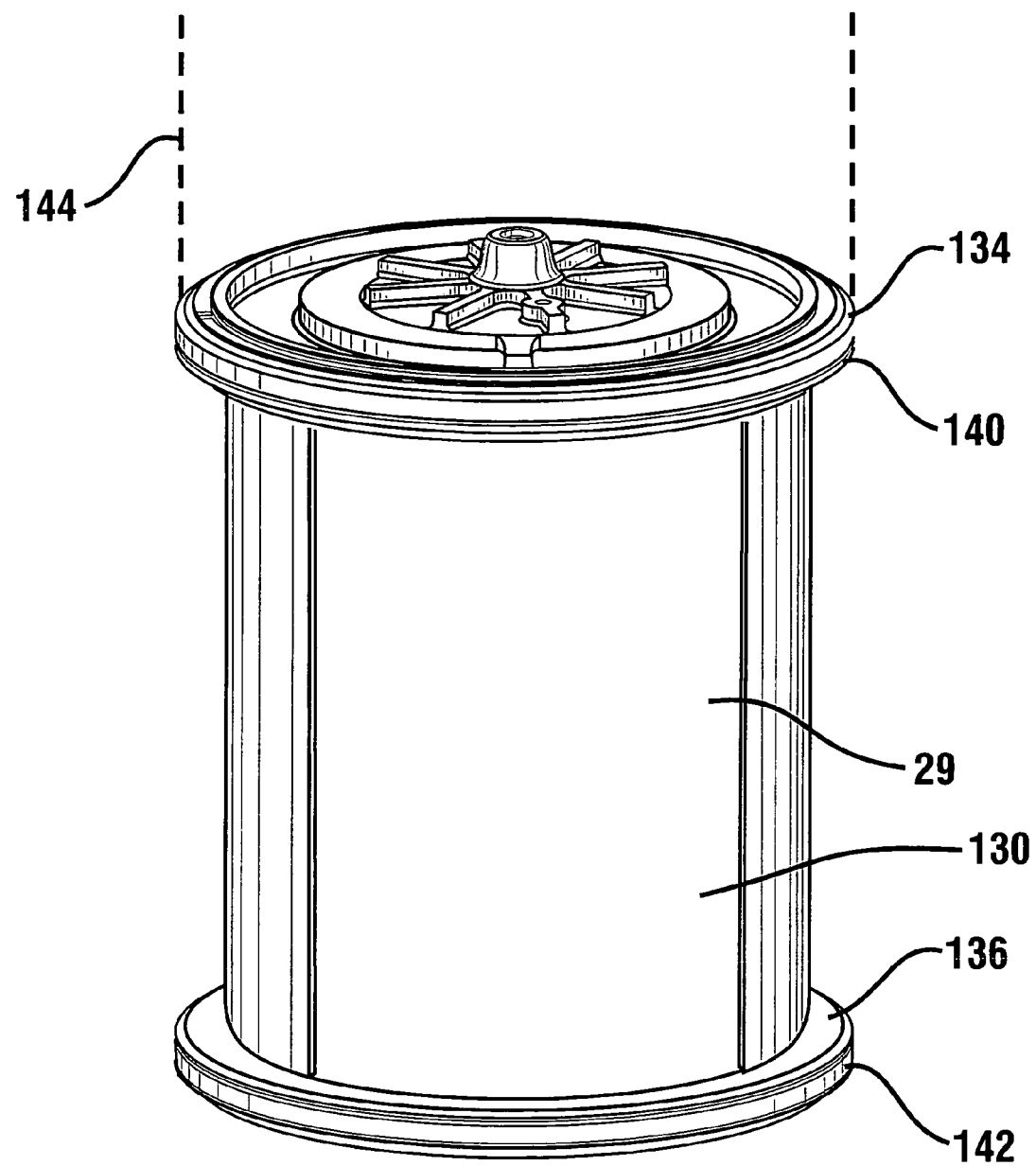
FIG. 12 is a perspective view of an exemplary carrier.

In an exemplary embodiment, a carrier 29 of the type shown in FIG. 12 or alternatively of types shown in the incorporated disclosures is enabled to be selectively moved between user terminal 10 and remote terminal 106 by the application of differential pressure produced in the transfer conduit tube by blowers 120, 122. As shown in FIG. 12, an exemplary carrier 29 includes a housing 130. The housing includes a first end member 134 and a second end member 136. The first end member 134 includes an annular resilient seal ring 140 supported thereon. Likewise, second end member 136 has an annular resilient seal ring 142 supported thereon. The seal rings provide slidable and generally fluid tight engagement between the carrier housing and an interior wall of the stationary upper member 18 and the pneumatic tube as schematically indicated 144 in FIG. 12. The angular seal rings enable the carrier to be moved in the tube through the application of a pressure differential on opposite sides of the carrier.

Figure 13:
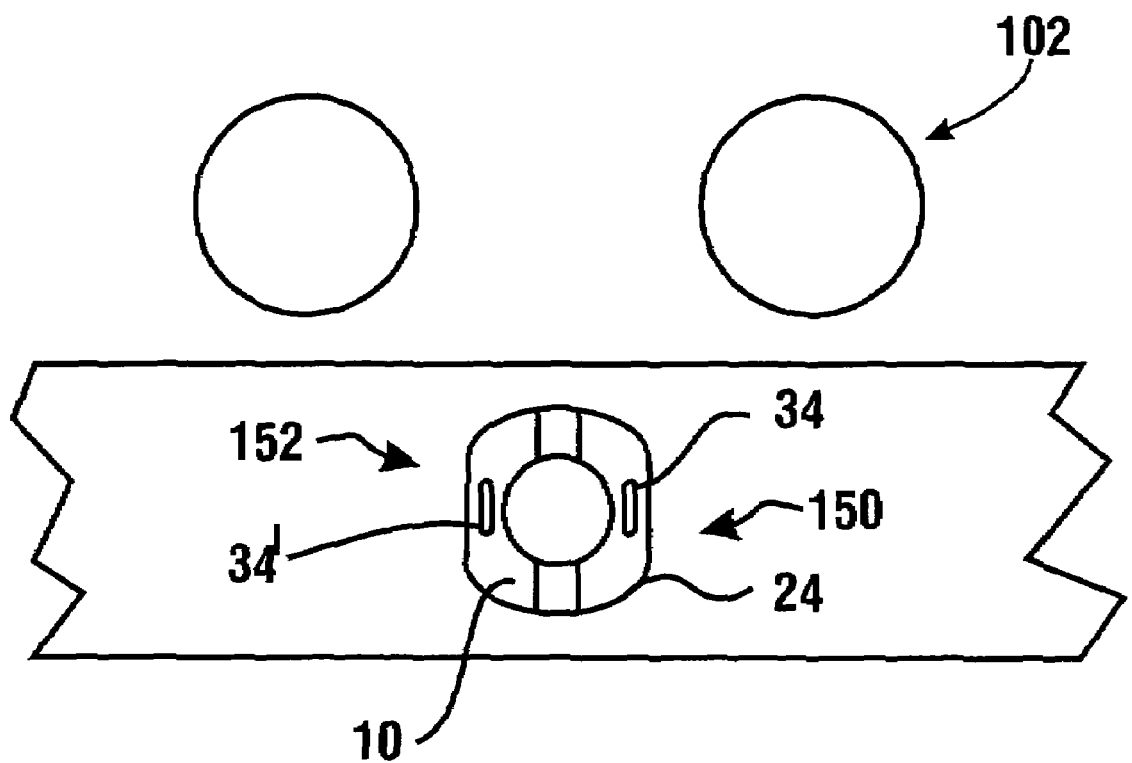
FIG. 13 is a partial top view of a service provider station showing an exemplary embodiment of the user terminal.

With reference to FIG. 13, in the exemplary embodiment, service provider station 102 enables two users to access and operate user terminal 10. Base member 24 includes dual control mechanisms 34, 34'. The construction of user terminal 10 permits access to the interior of user terminal 10 from two directions as indicated by arrows 150, 152.

In an exemplary embodiment, the user terminal 10 is readily accessible by two users who are positioned on opposed sides of the terminal. The body is situated so that each of the opposite faces of the base member and their associated control mechanisms is directed respectively to one of two users.

With the movable member in a closed position, the exemplary user terminal 10 is operable to receive a carrier 29 therein via the pneumatic terminal. When a carrier is in the terminal, as can be observed through the clear movable member 16, a first user may operate the control mechanism 34 to cause the drive sprocket 44 to rotate and thereby move the drive tape member 54. Successive slots 56 in the drive tape member are engaged by the radially-extending teeth 46 to slidably move the drive tape member through the generally 180 degree turn of guide block 40 and in the elongated passageway 82 of the first side rail 20. The first portion 60 of drive tape member is operably secured to movable member 16. Movement of the drive tape member in the first side rail causes coordinated movement of movable member 16. The lower end of the movable member is thus vertically displaced away from the base member 24 as the movable member moves from the closed position to the open position in response to the drive moving drive sprocket 44. As the movable member is vertically displaced, at least a portion of the stationary upper member 18 telescopes into the movable member 16. With the movable member in the open position so as to provide a user accessible opening, the carrier in the exemplary embodiment can be removed from between the side rails of the terminal. The contents of the carrier can then be removed, content inserted, data output therefrom or other action taken by the service provider as appropriate for the particular transaction.

When the user is ready to send the carrier 29 or a different carrier to a user at the other terminal, the carrier is placed by a user on the arrival pad 36, between the side rails. In this position the annular resilient seal ring on the upper portion of the carrier engages the inner wall of the stationary member in slidable but generally fluid tight relation. The control mechanism 34 is actuated, which causes operation of a blower by control circuitry and causes the carrier to be moved away from the terminal, through the tube to the opposite terminal via air pressure.

In an exemplary embodiment, when the carrier is to be returned to the user terminal 10 from the opposite terminal, a control mechanism is activated either at the user terminal or the opposite terminal. Drive sprocket 44 then rotates responsive to activation of the control mechanism to move the drive tape member 54 in an opposite direction. The drive tape member slides in the first side rail and in the guide block to vertically move the lower end movable member toward the base member 24, closing the opening at the user terminal. When the lower end of the movable member reaches the closed position the arrival pad cooperates with the movable member to form a generally airtight seal. As the movable member moves into the closed position, an extension portion 66 of the drive tape member slidably moves within elongated channel 94 of second side rail 22. A blower is then operated by the control circuitry to cause the carrier to move in the tube to the area in the tube above the terminal 10. The carrier then descends into the terminal cushioned by the controlled release of air from the terminal. Once the carrier has arrived in the user terminal the control mechanism can be activated to move the movable member to the open position provide a user with access to the carrier.

A second user may access and operate the exemplary user terminal 10 in similar fashion using the oppositely located control mechanism. This enables another user to conduct transactions with a user at the terminal. This makes it easier for service providers to service customers and speeds transactions.

Figure 14:
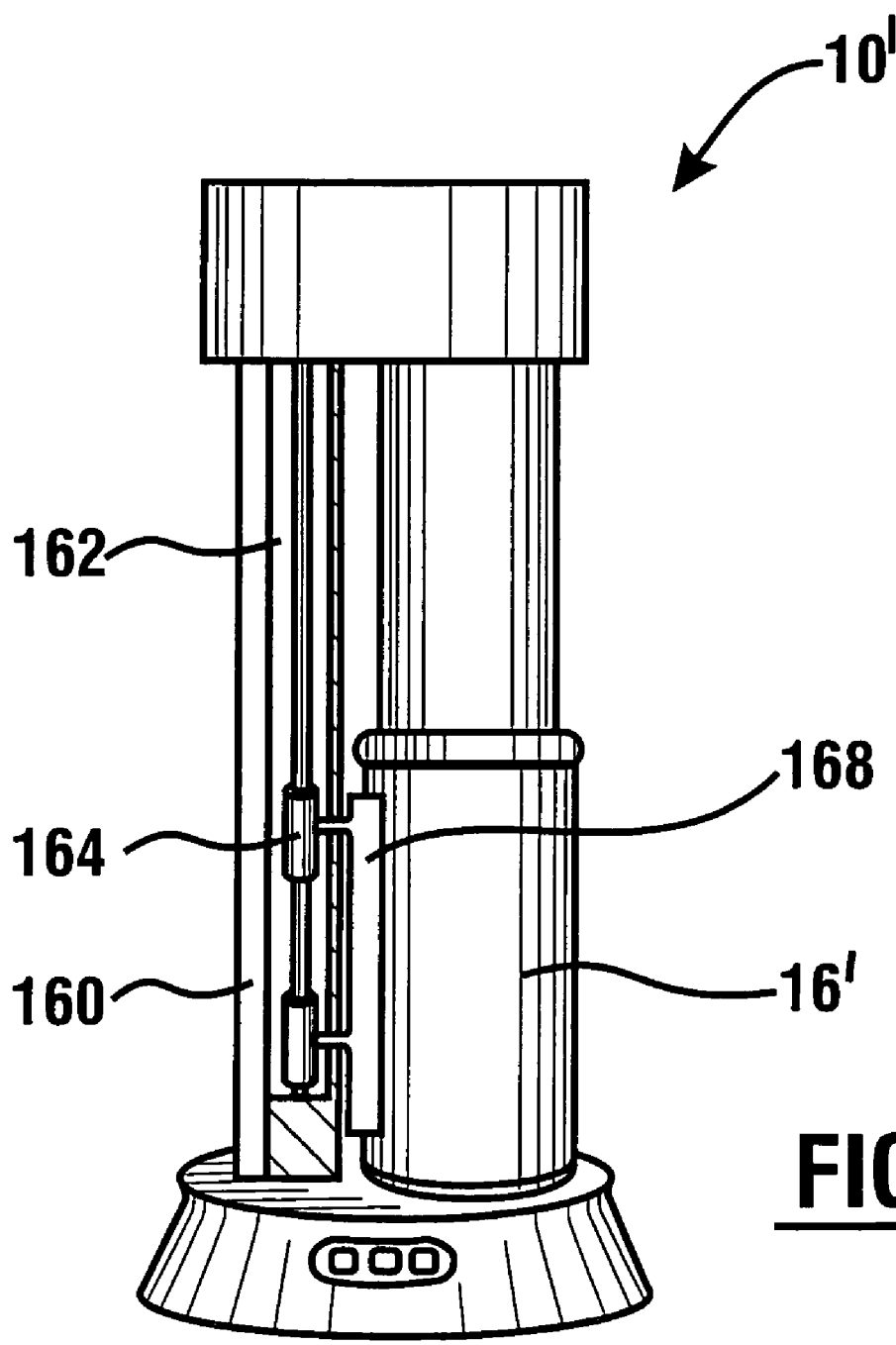
FIG. 14 is a front view, partially in cross-section, of an alternate embodiment of a user terminal.

FIG. 14 shows an alternate exemplary embodiment of a user terminal 10'. In this alternative embodiment the movable member 16' is movable through operation of a different form of linear movement mechanism. As illustrated, an exemplary linear movement mechanism includes a rodless cylinder 160 comprising an elongated cylinder body 162, a piston 164 reciprocally moveable within the cylinder body and a carriage 168 coupled to piston 164. Movable member 16' is secured to carriage 168 and is movable therewith in response to movement of piston 164. In this alternative exemplary embodiment a suitable source of compressed air or other working fluid is provided for selectively moving the piston of the cylinder. Control mechanisms and/or control circuitry on the base are in operative connection with suitable valves for selectively applying fluid pressure and moving the piston, and consequently the movable member, selectively between the open and closed positions.

In this exemplary embodiment the linear movement mechanism provides a single support structure extending adjacent the movable member. This enables users positioned on opposed sides of the terminal to view and access the terminal for purposes of receiving and sending a carrier. As in the case of the prior described exemplary embodiment, suitable multiple control mechanisms may be provided on the base of the unit or elsewhere to facilitate control of the terminal and the transport of carriers responsive to manual inputs.

In alternative exemplary embodiments, other types of drive members may be used for relatively moving the movable member and stationary member. Such moving devices may include for example, feed screws, rack and pinion gear arrangements and other types of drives and configurations.

Thus the exemplary apparatus and system achieve one or more of the above stated objectives, eliminate the difficulties encountered in the use of prior devices and systems, solve problems and attain one or more of the desirable results described herein.

In the foregoing description certain terms have been used for brevity, clarity and understanding, however no unnecessary limitations are to be implied therefrom because such terms are used for descriptive purposes and are intended to be broadly construed. Moreover the descriptions and illustrations herein are by way of examples and the invention is not limited to the details shown and described.

In the following claims, any feature described as a means of or performing a function shall be construed as encompassing any means known to those skilled in the art to be capable of performing the recited function, and shall not be deemed limited to the particular features shown herein or mere equivalents thereof.

Having described the features, discoveries and principles of the invention, the manner in which it is constructed and operated and the advantages and useful results attained; the new and useful structures, devices, elements, arrangements, parts, combinations, systems, equipment, operations, methods and relationships are set forth in the appended claims.

We claim:

1. A method comprising:

providing a user terminal having a body, the body including an opening through which a carrier may be placed in supporting connection with the body and removed from supporting connection with the body; a movable member, movable in supporting connection with the body between an open position in which a carrier at the terminal is accessible by a user through the opening and a closed position in which a carrier at the terminal is not accessible by a user through the opening; a flexible drive tape member extending in the body, wherein the drive tape member is in operative connection with the movable member; and, a drive in operative connection with the drive tape member, wherein the drive is selectively operative to cause the movable member to move between the closed and open positions;

receiving a carrier into the user terminal via movement of the carrier responsive to air pressure; and operating the drive to cause the movable member to move from the closed position to the open position.

2. A method comprising:

moving a carrier in a tube responsive to air pressure;

receiving the carrier in a user terminal in fluid communication with the tube, the user terminal having a body, the body including an opening through which a carrier may be taken from and received in the terminal; a movable member, movable in supporting connection with the body between an open position in which the carrier at the terminal is accessible by a user through the opening, and a closed position in which the carrier at the terminal is not accessible by a user, wherein the carrier is received in the user terminal when the movable member is in the closed position; a flexible drive tape member extending in the body, wherein the drive tape member is in operative connection with the movable member; and, a drive in operative connection with the drive tape member, wherein the drive is selectively operative to cause the movable member to move between the closed and open positions;

operating the drive responsive to at least one user input, to move the movable member from the closed position into the open position, whereby a user is enabled to access the carrier.

3. A method comprising:
(a) moving a carrier in a pneumatic tube responsive to air pressure away from a customer station and toward a service provider station;
(b) receiving the carrier at a user terminal of the service provider station,
  wherein the terminal is in operative connection with the tube,
  wherein the terminal includes a base, wherein the base includes a first control mechanism and a second control mechanism,
    wherein the first control mechanism and the second control mechanism are respectively arranged on opposite sides of the base,
    wherein the first control mechanism is arranged to receive first service provider manual input from a first service provider positioned adjacent thereto in the service provider station, wherein the first service provider manual input causes movement of the movable member,
    wherein the second control mechanism is arranged to receive second service provider manual input from a second service provider positioned adjacent thereto in the service provider station, wherein the second service provider manual input causes movement of the movable member,
      wherein the service provider station is configured to enable a second service provider positioned adjacent the second control mechanism to provide second service provider manual input to the second control mechanism while a first service provider positioned adjacent the first control mechanism is able to provide first service provider manual input to the first control mechanism,
  wherein the terminal includes an annular movable member, wherein the annular movable member is vertically movable from a closed position to an open position, wherein in the open position a carrier received at the terminal is accessible to both a first service provider positioned adjacent the first control mechanism and a second service provider positioned adjacent the second control mechanism;
(c) receiving either first service provider manual input at the first control mechanism or second service provider manual input at the second control mechanism; and
(d) responsive to manual input received in (c), causing operation of a movement mechanism to vertically move the annular movable member from the closed position to the open position.

4. The method of claim 3 wherein (c) includes:
operating a linear movement mechanism in operative connection with the movable member.

5. A method comprising:
(a) moving a carrier in a tube responsive to air pressure;
(b) receiving the carrier in a user terminal in operative connection with the tube; and
(c) vertically displacing an annular movable member from a closed position to an open position, including moving a flexible drive tape member in operative connection with the annular movable member, such that the carrier at the terminal is accessible to a user through an opening in the user terminal.

6. The method of claim 5 wherein the user terminal includes a stationary upper member, and wherein (c) includes causing at least a portion of the movable member to move in telescoping relation with regard to the upper member.

7. The method according to claim 3 wherein (c) includes moving a flexible drive tape member in operative connection with the movable member.

8. The method according to claim 6 wherein the user terminal includes at least one side rail, and wherein (c) includes moving the tape drive member in supporting connection with the at least one side rail.

9. The method according to claim 8 wherein the user terminal includes a pair of spaced side rails, and wherein in (c) the movable member moves in intermediate relation of the spaced side rails.

10. The method according to claim 9 wherein in (c) the drive tape member moves in supporting connection with each of the spaced side rails.

11. The method according to claim 10 wherein the user terminal includes a base and wherein in (c) the drive tape member moves through a generally 180 degree turn in the base.

12. The method according to claim 5 wherein the user terminal includes a base, wherein the base includes two disposed control mechanisms, wherein each control mechanism is adapted responsive to receiving at least one manual input to cause movement of the movable member, and further comprising:
(d) receiving at least one manual input through one of the control mechanisms;
wherein in (c) the movable member moves responsive to the at least one manual input received in (d).

13. The method according to claim 12 and further comprising:
(e) subsequent to (d), removing the carrier from the user terminal.

14. The method according to claim 13 and further comprising:
(f) subsequent to (e), placing the carrier in supporting connection with the user terminal;
(g) subsequent to (f), receiving at least one manual input through one of the control mechanisms;
(h) responsive to the at least one manual input received in (g), causing the carrier to be moved from the user terminal and in the tube responsive to air pressure.

15. The method according to claim 12 wherein the two disposed control mechanisms are on opposed sides of the base, wherein the two disposed control mechanisms comprise a first control mechanism and a second control mechanism, wherein the first control mechanism is accessible to a first user positioned on a first side of the user terminal while the second control mechanism is accessible to a second user positioned on a second side of the user terminal, wherein (d) includes either
  receiving at least one first user manual input via the first control mechanism while the second control mechanism is accessible to receive at least one manual input from a second user positioned on a second side of the user terminal, or
  receiving at least one second user manual input via the second control mechanism while the first control mechanism is accessible to receive at least one manual input from a first user positioned on a first side of the user terminal.

16. The method according to claim 15 wherein the movable member is configured to enable a carrier to be seen therethrough, wherein (b) includes receiving the carrier in the user terminal while the movable member is in the closed position, wherein the carrier is observable through the movable member by both a first user positioned on a first side of the user terminal and a second user positioned on a second side of the user terminal, wherein (d) includes either receiving at least one first user manual input subsequent to the carrier being observable by a first user positioned on a first side of the user terminal, or receiving at least one second user manual input subsequent to the carrier being observable by a second user positioned on a second side of the user terminal.

17. The method according to claim 5 wherein the user terminal is positioned in a service provider station, wherein the service provider station is located in either a bank facility or a pharmacy facility, wherein the user terminal includes a stationary upper member, wherein the user terminal includes at least one control mechanism adapted to receive at least one manual input to cause the movable member to move in telescoping relation with regard to the upper member, and further comprising:

(d) receiving at least one manual input through a control mechanism of the user terminal;

wherein in (c) the movable member moves in telescoping relation with regard to the upper member responsive to the at least one manual input received in (d), (e) subsequent to (c), removing the carrier from the user terminal.

18. The method according to claim 5 wherein the user terminal comprises a terminal of a service provider station, wherein the terminal includes a first control mechanism and a second control mechanism, wherein the second control mechanism is arranged opposite the first control mechanism, wherein the first control mechanism is arranged to receive from a first service provider positioned adjacent thereto in the service provider station, manual input causing movement of the movable member, wherein the second control mechanism is arranged to receive from a second service provider positioned adjacent thereto in the service provider station, manual input causing movement of the movable member, wherein (a) includes moving the carrier in a pneumatic tube away from a customer station and toward the service provider station, wherein (b) includes receiving the carrier in the terminal of the service provider station, wherein (c) includes telescopically moving the movable member responsive to either the first control mechanism receiving input from a first service provider or the second control mechanism receiving input from a second service provider.

19. The method according to claim 5 wherein (a) includes moving the carrier between a customer station positioned adjacent a customer drive-through lane and a service provider station located inside a building.

20. The method according to claim 5 wherein the user terminal includes dual control mechanisms comprising a first control mechanism and a second control mechanism respectively arranged on opposite sides of the user terminal, wherein the user terminal comprises an annular upper member, wherein the movable member is telescopically movable relative to the upper member between a closed position and an open position, wherein at least a portion of the movable member is transparent enabling a user to determine whether a carrier is in the user terminal while the movable member is in the closed position, and further comprising:

(d) prior to (c), receiving manual input at either:

the first control mechanism, or the second control mechanism, wherein (c) includes moving the movable member telescopically relative to the upper member responsive to (d).

21. The method according to claim 4 wherein the linear movement mechanism includes a rodless cylinder, wherein (c) includes operating a rodless cylinder.

22. The method according to claim 3 wherein the service provider station is located in a bank building, wherein (a) includes moving the carrier in the bank building.

23. The method according to claim 3 wherein the service provider station is located in a building, wherein (a) includes moving the carrier away from a customer station positioned adjacent a customer drive-through lane and toward a service provider station located inside the building.

24. The method according to claim 23 wherein the building includes a bank, wherein (b) includes receiving the carrier at a service provider station located inside the bank.

25. The method according to claim 23 wherein the building includes a pharmacy facility, wherein (b) includes receiving the carrier at a service provider station located inside the pharmacy facility.

* * * * *